(12) United States Patent
Martin et al.

(10) Patent No.: US 12,126,219 B2
(45) Date of Patent: Oct. 22, 2024

(54) PERMANENT MAGNET ROTOR WITH CONDUCTIVE FLUX BARRIER

(71) Applicant: ABB Schweiz AG, Baden (CH)

(72) Inventors: William E. Martin, Greenville, SC (US); Robert F. McElveen, Jr., Anderson, SC (US); Nicolas W. Frank, Greer, SC (US)

(73) Assignee: ABB Schweiz AG, Baden (CH)

( * ) Notice: Subject to any disclaimer, the term of this patent is extended or adjusted under 35 U.S.C. 154(b) by 52 days.

(21) Appl. No.: 17/381,649

(22) Filed: Jul. 21, 2021

(65) Prior Publication Data

US 2023/0027862 A1    Jan. 26, 2023

(51) Int. Cl.
*H02K 1/27*    (2022.01)
*H02K 1/276*    (2022.01)

(52) U.S. Cl.
CPC .................................... *H02K 1/276* (2013.01)

(58) Field of Classification Search
CPC ....... H02K 1/276; H02K 1/2766; H02K 21/46
USPC ..................................................... 310/156.53
See application file for complete search history.

(56) References Cited

U.S. PATENT DOCUMENTS

| 4,188,554 | A | * | 2/1980 | Binns | ...................... | H02K 21/46 |
| | | | | | | 310/162 |
| 4,568,846 | A | * | 2/1986 | Kapadia | .................. | H02K 21/46 |
| | | | | | | 310/156.83 |
| 6,274,960 | B1 | * | 8/2001 | Sakai | ...................... | H02K 1/246 |
| | | | | | | 310/168 |
| 6,342,745 | B1 | * | 1/2002 | Sakai | ...................... | H02K 21/46 |
| | | | | | | 310/156.55 |

(Continued)

FOREIGN PATENT DOCUMENTS

| DE | 102016123064 A1 | | 5/2018 |
| TW | 362843 U1 | * | 6/1999 |
| WO | WO 2015/171486 A1 | | 11/2015 |

OTHER PUBLICATIONS

Endla et al., "Analysis on Demagnetization Characteristics of Spoke Configured Interior Permanent Magnet Rotors," 2014 *IEEE International Conference on Power Electronics, Drives and Energy Systems* (PEDES), IEEE, 4 pp. (2014).

(Continued)

*Primary Examiner* — Alex W Mok

(74) *Attorney, Agent, or Firm* — Leydig, Voit & Mayer, Ltd.

(57) ABSTRACT

An electric machine includes a stator defining a rotor chamber. A rotor is disposed within the chamber and is configured to rotate about a central axis. The rotor includes a plurality of stacked laminations to form a rotor core. The rotor core has an outer diameter and each of the laminations includes a plurality of magnet slots that are radially spaced apart from the outer diameter and angled inwardly with one end of each magnet slot adjacent to the outer diameter. Each magnet slot has a permanent magnet disposed therein, adjacent pairs of the ferrite permanent magnets defining poles for the rotor. Each magnet slot has two opposite ends that define inner and outer magnet free areas. The outer magnet free areas are adjacent the rotor outer diameter and the inner magnet free areas are radially inwardly positioned. Each outer magnet free area is provided with conductive material.

22 Claims, 4 Drawing Sheets

(56) References Cited

U.S. PATENT DOCUMENTS

| | | | | |
|---|---|---|---|---|
| 6,552,462 | B2* | 4/2003 | Sakai | H02K 1/246 |
| | | | | 310/156.56 |
| 6,844,652 | B1* | 1/2005 | Chu | H02K 1/2766 |
| | | | | 310/216.097 |
| 6,891,300 | B2* | 5/2005 | Noda | H02K 1/04 |
| | | | | 310/216.106 |
| 7,183,686 | B2* | 2/2007 | Sasaki | H02K 1/276 |
| | | | | 310/156.53 |
| 7,932,658 | B2* | 4/2011 | Ionel | H02K 1/276 |
| | | | | 310/156.52 |
| 8,102,091 | B2* | 1/2012 | Ionel | H02K 1/2766 |
| | | | | 310/156.53 |
| 9,590,481 | B2* | 3/2017 | Jensen | H02K 21/46 |
| 9,620,999 | B2* | 4/2017 | McElveen | H02K 17/26 |
| 10,075,105 | B2* | 9/2018 | McElveen | H02P 1/166 |
| 2008/0224558 | A1* | 9/2008 | Ionel | H02K 1/2766 |
| | | | | 310/156.57 |
| 2010/0026128 | A1* | 2/2010 | Ionel | H02K 1/276 |
| | | | | 310/156.53 |
| 2010/0156234 | A1* | 6/2010 | Hoemann | H02K 1/276 |
| | | | | 310/216.106 |
| 2011/0249528 | A1* | 10/2011 | Wand | H02K 21/46 |
| | | | | 366/251 |
| 2011/0266910 | A1* | 11/2011 | Suzuki | H02K 1/2766 |
| | | | | 310/156.53 |
| 2012/0032539 | A1* | 2/2012 | Hori | H02K 1/2766 |
| | | | | 310/156.53 |
| 2012/0082573 | A1* | 4/2012 | Fargo | H02K 21/46 |
| | | | | 29/596 |
| 2012/0146446 | A1* | 6/2012 | Lin | H02K 21/46 |
| | | | | 310/162 |
| 2013/0154426 | A1 | 6/2013 | Melfi et al. | |
| 2014/0283373 | A1* | 9/2014 | Melfi | H02K 1/223 |
| | | | | 29/598 |
| 2014/0285050 | A1* | 9/2014 | Melfi | H02K 21/46 |
| | | | | 310/156.78 |
| 2015/0288233 | A1* | 10/2015 | Kim | H02K 1/2766 |
| | | | | 310/156.01 |
| 2015/0303747 | A1* | 10/2015 | McElveen | H02K 17/165 |
| | | | | 318/720 |
| 2015/0303847 | A1* | 10/2015 | McElveen | H02K 17/165 |
| | | | | 318/400.41 |
| 2017/0271930 | A1* | 9/2017 | Lee | H02K 1/223 |
| 2019/0058421 | A1* | 2/2019 | McElveen | H02P 1/166 |
| 2019/0190358 | A1* | 6/2019 | Perigo | H02K 15/03 |
| 2019/0214862 | A1* | 7/2019 | Hoemann | H02K 1/12 |

OTHER PUBLICATIONS

Shen et al., "Investigation and Countermeasures for Demagnetization in Line Start Permanent Magnet Synchronous Motors," *IEEE Transactions on Magnetics*, 49(7): 4068-4071 (Jul. 2013).

European Patent Office, Extended European Search Report in European Patent Application No. 22185689.1, 9 pp. (Dec. 2, 2022).

* cited by examiner

PERMANENT MAGNET ROTOR WITH CONDUCTIVE FLUX BARRIER

BACKGROUND

Typical interior permanent magnet rotors are susceptible to demagnetization from fault events and/or overloads. While of even greater concern with electrical machines with ferrite magnets, all types of interior permanent magnet motor designs are subject to limitations.

Despite being referred to as permanent, such magnets are capable of being demagnetized. It is possible to remove the magnetic properties of the permanent magnet material. A permanent magnetic substance can become demagnetized if the material is significantly strained, allowed to reach significant temperatures, or is impacted by a large electrical disturbance, for example.

First, straining a permanent magnet is typically done by physical means. A magnetic material can become demagnetized, if not weakened, if it experiences violent impacts/falls. A ferromagnetic material has inherent magnetic property. However, these magnetic properties can emit in any multitude of directions. One way ferromagnetic materials are magnetized is by applying a strong magnetic field to the material to align its magnetic dipoles. Aligning these dipoles forces the magnetic field of the material into a specific path. A violent impact can remove the atomic alignment of the material's magnetic domains, which weakens the strength of the intended magnetic field.

Secondly, temperatures also can affect a permanent magnet. Temperatures force the magnetic particles in a permanent magnet to become agitated. The magnetic dipoles have the ability to withstand some amount of thermal agitation. However, long periods of agitation can weaken a magnet's strength, even if stored at room temperature. In addition, all magnetic materials have a threshold known as the "Curie temperature," which is a threshold that defines the temperature at which the thermal agitation causes the material to completely demagnetize. Terms such as coercivity and retentivity are used to define magnetic material strength retention capability.

Finally, electrical disturbances can cause a permanent magnet to demagnetize. These electrical disturbances can be from the material interacting with a magnetic field or if a large current is passed through the material. Much in the same way a strong magnetic field or current can be used to align a material's magnetic dipoles, another strong magnetic field or current applied to the field generated by the permanent magnet can result in demagnetization. Electrical motor faults can cause such disturbances via power surges, voltage drops, phase unbalance, phase losses causing variations in the absorbed current, and short circuits, for example.

The present disclosure is directed to an improved rotor for a permanent magnet machine that protects permanent magnets in electrical motors from demagnetization based on electrical disturbances.

BRIEF SUMMARY

In one embodiment, an electric machine is disclosed that includes a stator defining a rotor chamber. A rotor is disposed within the chamber and is configured to rotate relative to the stator about a central axis. The rotor includes a plurality of generally similar laminations stacked end-to-end to form a rotor core. The rotor core has an outer diameter and each of the laminations includes a plurality of magnet slots that are radially spaced apart from the outer diameter and angled inwardly with one end of each magnet slot adjacent to the outer diameter. Each magnet slot has a permanent magnet disposed therein, adjacent pairs of the ferrite permanent magnets defining poles for the rotor. Each magnet slot has two opposite ends that define inner and outer magnet free areas. The outer magnet free areas are adjacent the rotor outer diameter and the inner magnet free areas are radially inwardly positioned relative to the rotor core outer diameter. Each outer magnet free area is provided with rotor bar material.

These and other features of the disclosure will be apparent from the following detailed description and accompanying drawings.

DETAILED DESCRIPTION

Figure 1:
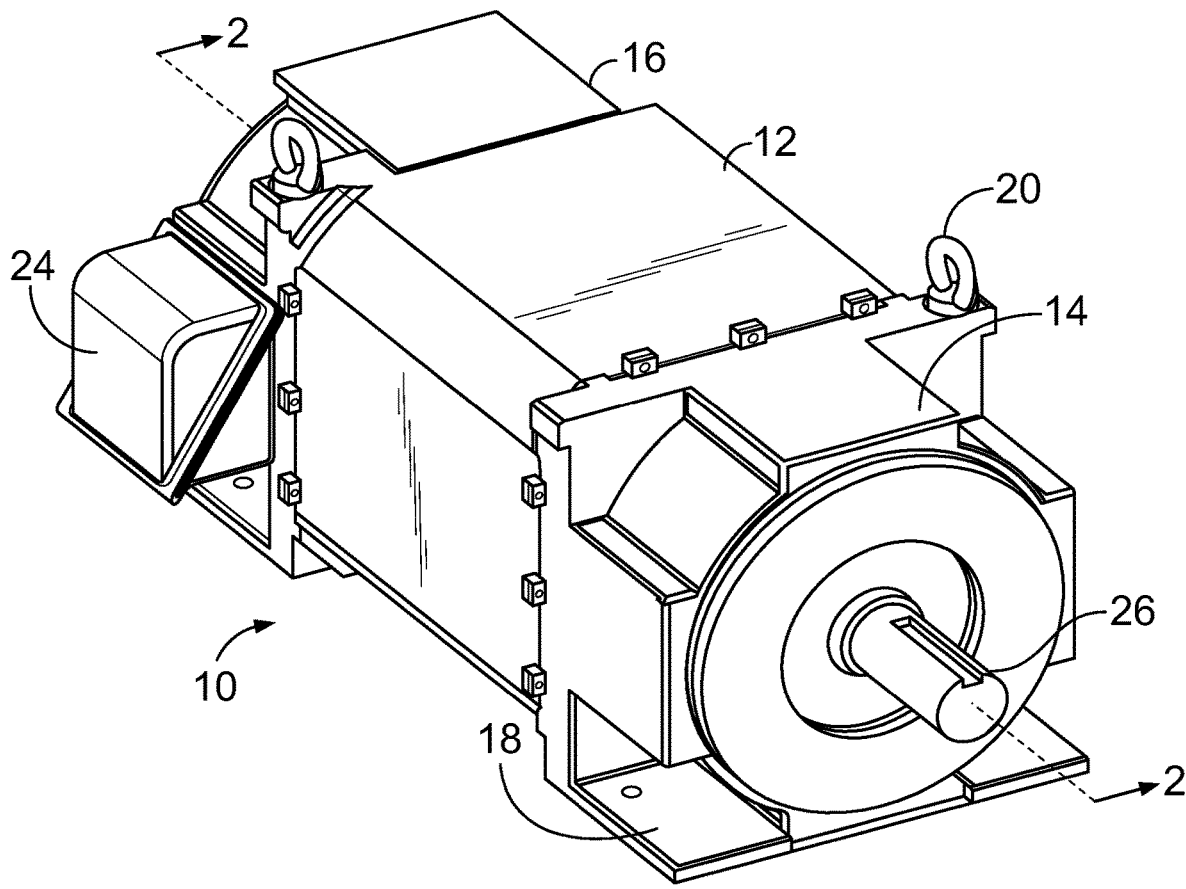
FIG. 1 is a perspective view of a permanent magnet motor (a LSIPM motor).

Now referring generally to the figures where, whenever possible, like reference numbers will refer to like elements, there is illustrated in FIG. 1 an exemplary electric motor 10. In the embodiment illustrated, the motor 10 comprises a line start permanent magnet motor that is designed to use permanent magnets and operates at high efficiency.

The exemplary motor 10 comprises a frame 12 capped at each end by drive and opposite drive end caps 14, 16, respectively. The frame 12 and the drive and opposite drive end caps 14, 16 cooperate to form the enclosure or motor housing for the motor 10. The frame 12 and the drive and opposite drive end caps 14, 16 may be formed of any number of materials, such as steel, aluminum, or any other suitable structural material. The drive and opposite drive end caps 14, 16 may include mounting and handling features, such as the illustrated mounting feet 18 and eyehooks 20.

To induce rotation of the rotor, current is routed through stator windings disposed in the stator. (See FIG. 2). Stator windings are electrically interconnected to form groups as is known. The stator windings are further coupled to terminal leads (not shown), which electronically connect the stator windings to an external power source (not shown), as is known. A conduit box 24 houses the electrical connection between the terminal leads and the external power source. The conduit box 24 comprises a metal or plastic material, and advantageously, provides access to certain electrical components of the motor 10. Routing electrical current from its external power source through the stator windings produces a magnetic field that induces rotation of the rotor. A rotor shaft 26 coupled to the rotor rotates in conjunction with the rotor about a center axis 28. That is, rotation of the rotor translates into a corresponding rotation of the rotor shaft 26. As appreciated by those of ordinary skill in the art, the rotor shaft may couple to any number of drive machine elements, thereby transmitting torque to the given drive machine element. By way of example, machines such as pumps, compressors, fans, conveyors, and so forth, may harness the rotational motion of the rotor shaft 26 for operation.

Figure 2:
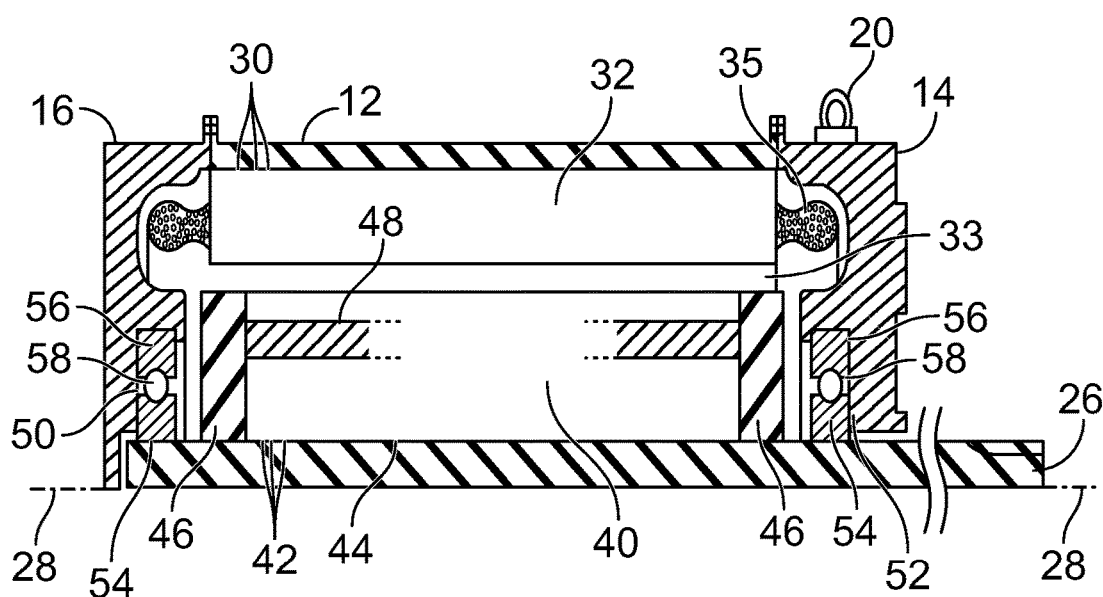
FIG. 2 is a partial cross-section view of the motor of FIG. 1 along plane 2-2 of FIG. 1.
Figure 3:
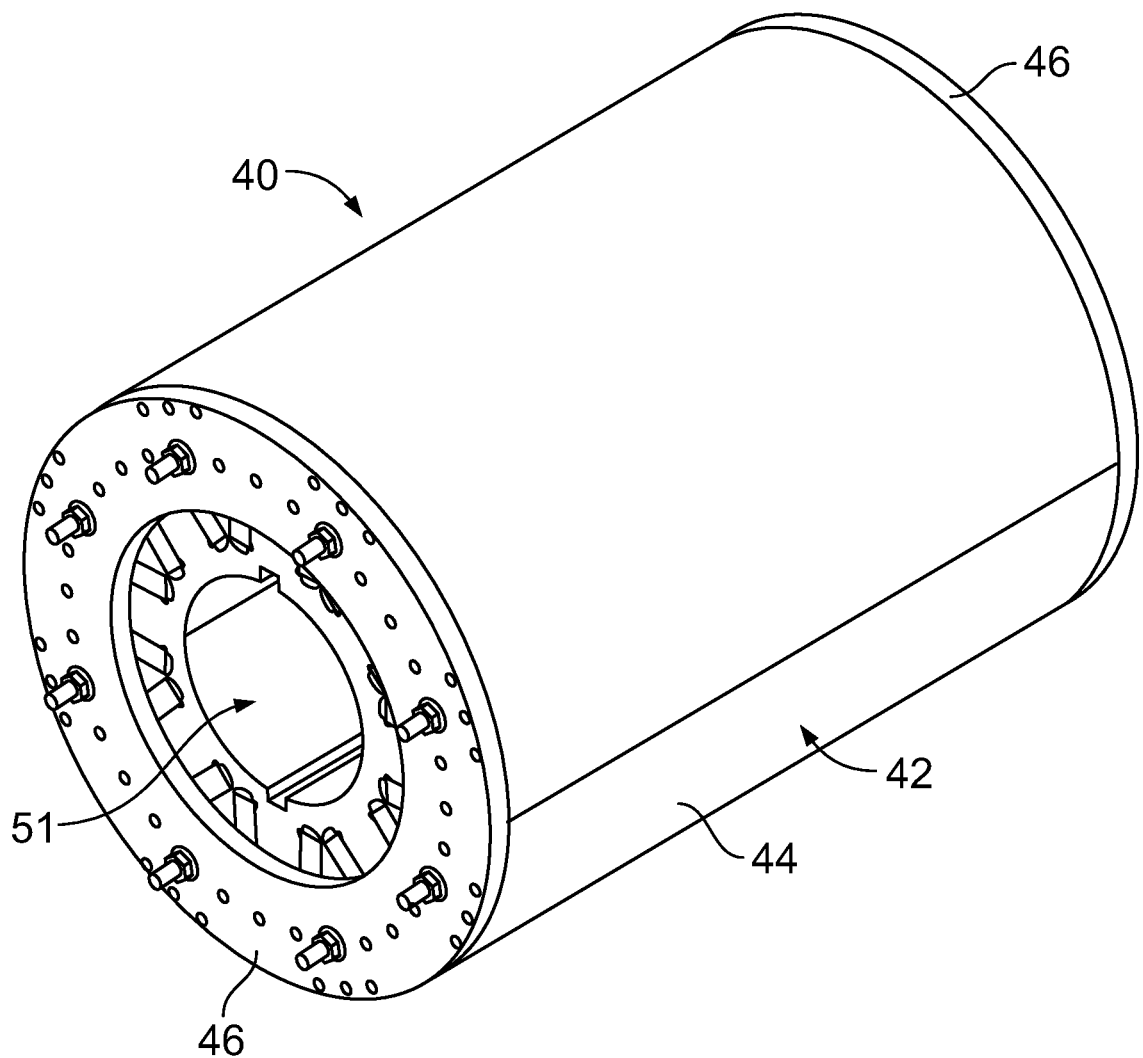
FIG. 3 is a perspective view of a rotor of a permanent magnet motor according to an embodiment of the disclosure.
Figure 4:
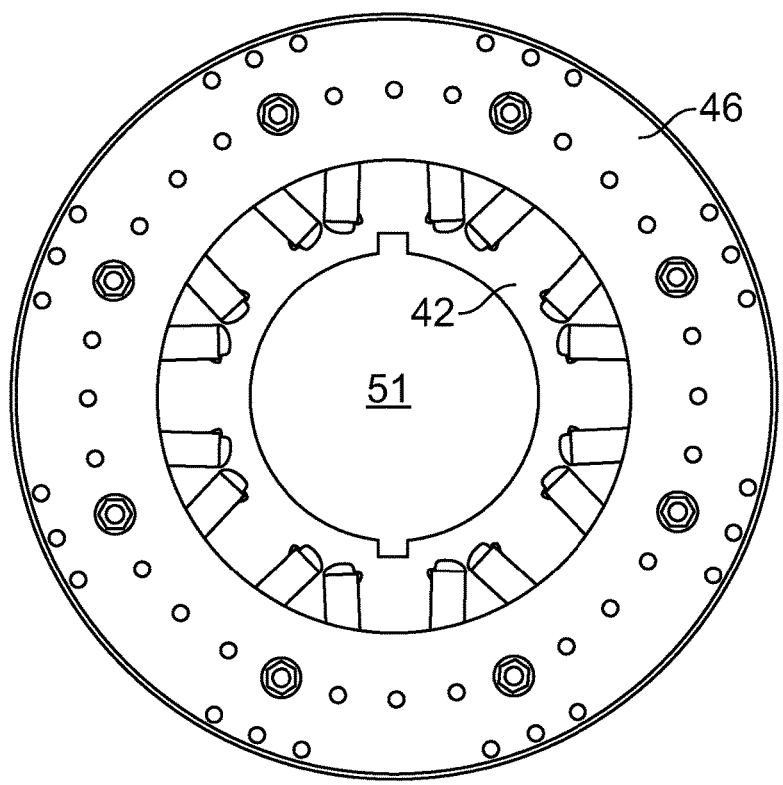
FIG. 4 is an end view of the rotor of FIG. 3.

FIG. 2 is a partial cross-sectional view of the motor 10 of FIG. 1 along plane 2-2 of FIG. 1. To simplify the discussion, only the top portion of the motor 10 is shown, as the structure of the motor 10 is essentially mirrored along its centerline. As discussed above, the frame 12 and the drive and opposite drive end caps 14, 16 cooperate to form an enclosure or motor housing for the motor 10. Within the enclosure or motor housing resides a plurality of stator laminations 30 placed next to and aligned with one another to form a lamination stack, such as a contiguous stator core 32. In the exemplary motor 10, the stator laminations 30 are substantially identical to one another, and each stator lamination 30 includes features that cooperate with adjacent laminations to form cumulative features for the contiguous stator core 32. For example, each stator lamination 30 includes a central aperture that cooperates with the central aperture of adjacent stator laminations to form a rotor chamber 33 that extends the length of the stator core 32 and that is sized to receive a rotor allowing for a specified air gap.

Referring also to FIGS. 2-6, the rotor assembly 40, which may be a cast aluminum assembly, resides within the rotor chamber 34, and similar to the stator core 32, the rotor assembly 40 comprises a plurality of rotor laminations 42 aligned and adjacently placed with respect to one another to form a contiguous rotor core 44. End members 46 are disposed on opposite ends of the rotor core 44 and may be generally circular in cross-section with an outer diameter that generally approximates the diameter of the rotor laminations 42.

To support the rotor assembly 40, the exemplary motor 10 includes drive and opposite drive bearing sets 50, 52, respectively, that are secured to the rotor shaft 26 and that facilitate rotation of the rotor assembly 40 within the stationary stator core 32. During operation of the motor 10, the bearing sets 50, 52 transfer the radial and thrust loads produced by the rotor assembly 40 to the motor housing. Each bearing set 50, 52 includes an inner race 54 disposed circumferentially about the rotor shaft 26. The tight fit between the inner race 54 and the rotor shaft 26 causes the inner race 54 to rotate in conjunction with the rotor shaft 26. Each bearing set 50, 52 also includes an outer race 56 and rotational elements 58, which are disposed between the inner and outer races 54, 56. The rotational elements 58 facilitate rotation of the inner races 54 while the outer races 56 remain stationary and mounted with respect to the drive and opposite drive end caps 14, 16. Thus, the bearing sets 50, 52 facilitate rotation of the rotor assembly 40 while supporting the rotor assembly 40 within the motor housing, i.e., the frame 12 and the drive and opposite drive end caps 14, 16. To reduce the coefficient of friction between the races 54, 56 and the rotational elements 58, the bearing sets 50, 52 are coated with a lubricant. Although the drawings show the bearing sets 50, 52 with balls as rotational elements, the bearing sets may be other constructions, such as sleeve bearings, pin bearings, roller bearings, etc.

When assembled, the rotor laminations 42 cooperate to form a shaft chamber 51 located in the center of the lamination 42 that extends through the center of the rotor core 44 and that is configured to receive the rotor shaft 26 therethrough. The rotor shaft 26 is secured with respect to the rotor core 44 such that the rotor core and the rotor shaft rotate as a single entity about the rotor center axis 28, and in one example, via a spline and keyway arrangement as is known. As described below in greater detail, in each lamination, magnet slots, and in the case of the LSIPM, rotor bar apertures, may also cooperate to form passages extending through the rotor core 44.

Figure 5:
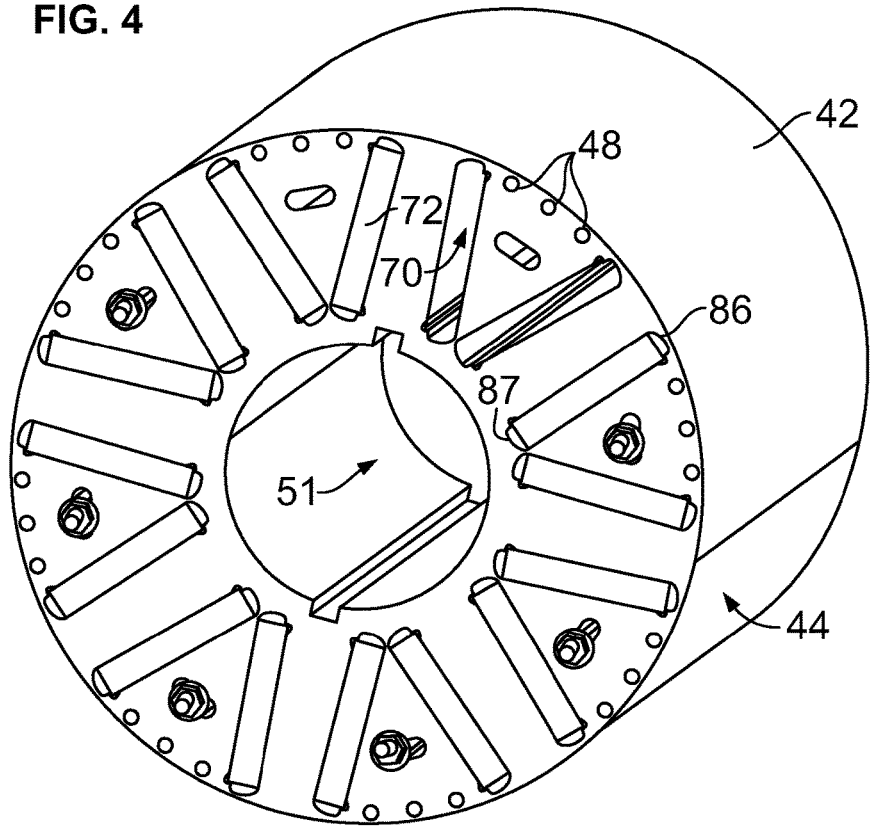
FIG. 5 is a perspective view of a rotor core of the rotor of FIG. 3.
Figure 6:
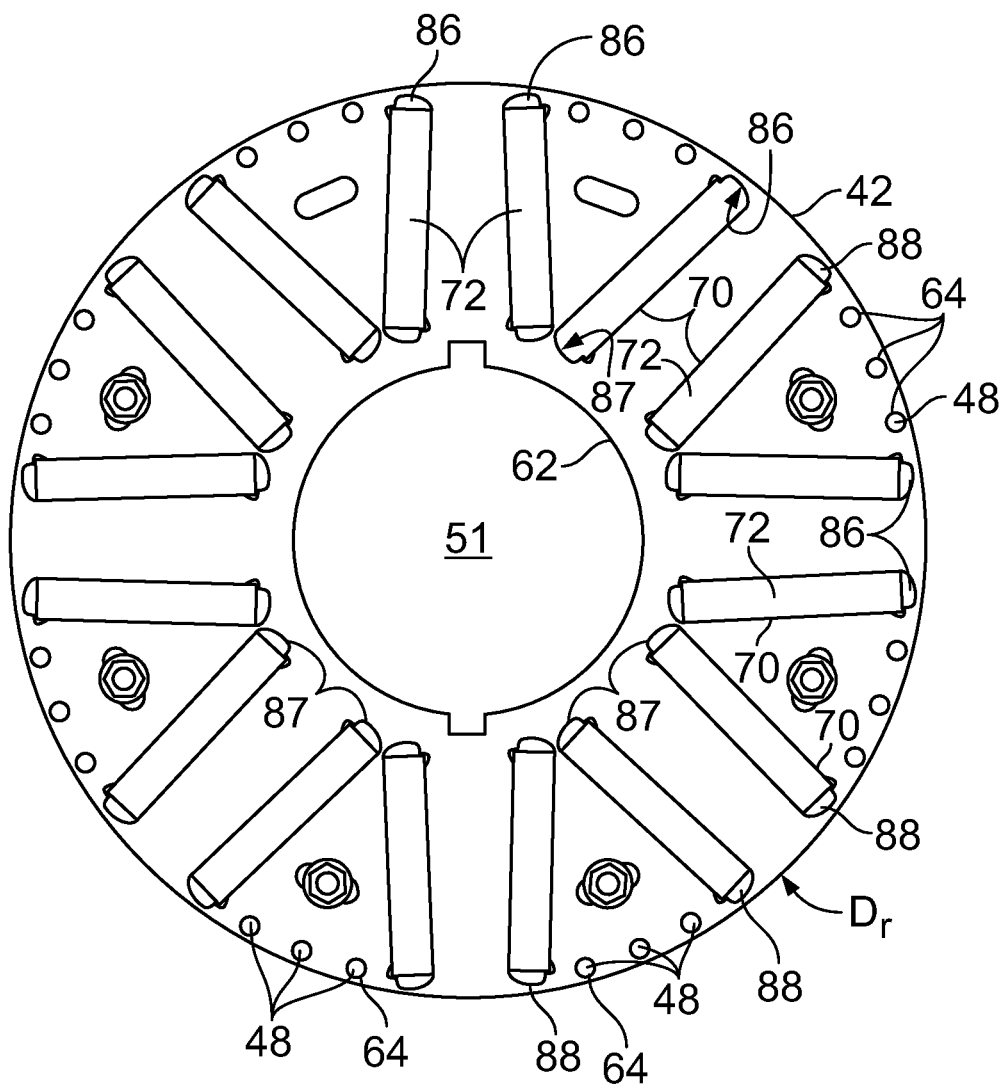
FIG. 6 is an end view of a lamination of the rotor core of the rotor of FIG. 3.

Referring to FIGS. 5 and 6, each rotor lamination 42 has a generally circular cross-section and is formed of electrical steel. Extending from end-to-end, i.e., transverse to the cross-section, each lamination 42 includes features that, when aligned with adjacent laminations 42, form cumulative features that extend axially through the rotor core 44.

Each rotor lamination 42 has a generally circular cross-section and is formed of a magnetic material, such as electrical steel. Each lamination may be any suitable thickness, for example from about 0.018-0.025" in axial thickness. Extending from end-to-end, i.e., transverse to the cross-section, each lamination 42 includes features that, when aligned with adjacent laminations 42, form cumulative features that extend axially through the rotor core 44. For example, each exemplary rotor lamination 42 has a circular shaft aperture 62 located in the center of the lamination 42 as noted above. The shaft apertures 62 of adjacent laminations 42 cooperate to form shaft chamber 51 configured to receive the rotor shaft 26 (see FIG. 2) therethrough. The rotor core has an outer diameter ("Dr").

Additionally, each lamination 42 includes a series of rotor bar apertures 64 that are arranged at positions about the lamination such that when assembled, the rotor bar apertures cooperate to form cylindrical, for example, channels for rotor bars that extend through the rotor core 44. The rotor bar apertures are spaced radially inward from and adjacent to the rotor outer diameter (Dr) to form what is commonly referred to as a squirrel cage.

The rotor bars 48, disposed or formed in the rotor bar apertures 64 may present the same shape as the rotor bar slots 64 to provide a tight fit for the rotor bars 48 within the rotor channels. The rotor bars may be manufactured with tight tolerances between the rotor bars 48 and the rotor bar slots, for instance, for a fabricated/swaged rotor bar design. Furthermore, the rotor bars 48 may be cast into the channels of the assembled lamination stack. The rotor bars 48 may be made of aluminum or any suitable conductive material. It will be understood that rotor bars fitted to circular apertures will be cylindrical with a round cross section. However, the rotor bars may be other suitable cross sectional shapes such as rectangular and fitted to correspondingly shaped apertures.

Additionally, the rotor laminations 42 include magnet slots 70. Permanent magnets 72 may be disposed in the magnet slots form poles for the rotor. The magnet slots may be arranged so the magnets are in a single layer or multi-layers. The magnet slots may also be arranged so the magnets form a conventional "V"- or "U"-shape. There may be only one magnet per slot or multiple magnets per slot 70. The magnets 72 may be magnetized in a generally radial direction to establish alternately inwardly and outwardly disposed north and south poles on adjacent magnets. This means that adjacent magnets cooperate to establish alternate north and south poles on the periphery of the rotor as is known. The rotor may be constructed with any even number of poles. An exemplary lamination for an eight pole motor is shown in FIG. 6. The general magnetization and saturation established by the magnets are well understood and so will not be discussed herein.

The magnet slots 70 extend to the peripheral edge of the rotor such that a radially outward end of the magnet slot is adjacent the peripheral edge (Dr). One or more of the magnet slots 70 may have its radially outward end at generally the same radial position relative to the rotor outer diameter (Dr) as the rotor bar apertures as shown in the drawings, or one or more magnet slots may extend radially outward and terminate at different distances relative to each other and/or the rotor bar slots, depending upon the application. In the illustrated embodiment, the magnet slots 70 terminate at approximately the same distance from the peripheral edge of the lamination as that of the outer ring of the rotor bar apertures 64 so as to maximize the magnetic effect generated by the magnets 72.

The magnets 72 disposed in the magnet slots 70 have a smaller longitudinal length in the direction of the magnet slots such that the magnets, when installed in the magnet slot, forms an outer magnet slot aperture 86. The outer magnet slot aperture 86 is free of magnet material, i.e., is magnet-free, between the end of each permanent magnet and the part of the magnet slot adjacent the peripheral edge of the lamination and an inner magnet slot aperture 87, which is free of magnetic material, i.e., is magnet-free, between the end of each permanent magnet and the part of the magnet slot radially inwardly of each magnet.

Each of the pairs of permanent magnets 72 form a pole, in the illustrated example, each of the "V" shaped pairs of magnets, creates, for example, an angle of about 45 degrees. Other angles of the ferrite magnets 72 are contemplated. The magnet angle may correspond to the angle formed between the edges of adjacent magnet slots 70. The magnet angle may also correspond to an angle between reference lines passing through points on adjacent magnets where the pole of each magnet changes direction. For instance, adjacent magnets may have a north pole on one side of each of the magnets and a south pole on another side of each of the magnets. The magnet angle may correspond to the angle between a first reference line passing through a center plane of one magnet where the poles switch direction and a second reference line passing through a center plane of an adjacent magnet where the poles switch direction. The magnets 72 may be rotationally symmetrically disposed about the axis of rotation and generally define the poles of the motor. Depending on the number of poles, the magnets 72 may be disposed in different repetition patterns, such as at intervals of 180 degrees, 60 degrees, 45 degrees, etc., for example. The magnets may be magnetized in a generally radial direction to establish inwardly and outwardly disposed north and south poles on the magnets. This means that adjacent magnets cooperate to establish alternate north and south poles on the periphery of the rotor. The rotor may be constructed with any even number of poles. The angle between the magnets of a pole, along with other parameters, generally defines the pole width. Alternatively, or additionally, the width of the magnets may be selected to achieve a desired pole width. While the widths and edges of the poles generally correspond with the angular positions of edges of the magnets, the width and edges of a pole are not exclusively a function of the size of the permanent magnets associated with the pole.

Each outer magnet slot aperture 86 is filled with conductive material 88 to form a substantially semicircular or "D" shaped rotor bar. The inner magnet slot aperture 87 may be left unfilled. Alternatively, both outer and inner apertures 86, 87 are filled with conductive material. The conductive material 88 forming all of the bars in apertures 86 are connected to each other, essentially forming a cage, which operates to protect the magnets 72 from magnetic disturbances. When a magnetic disturbance occurs, a demagnetizing field may be generated to which the magnets 72 can be exposed. The demagnetizing field induces a current in the conductive material 88 that generates a counteracting field that is opposite in phase to that generated by the magnetic disturbance, which has the effect of canceling the effects of the demagnetizing field on the magnets 72, thus protecting the magnets from becoming demagnetized.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

The invention claimed is:

1. An electric machine comprising:
a stator defining a rotor chamber; and
a rotor is disposed within the rotor chamber and is configured to rotate relative to the stator about a central axis, the rotor comprising a plurality of generally similar laminations stacked end-to-end to form a rotor core, the rotor core having an outer diameter;
wherein each of the laminations includes a plurality of magnet slots that are radially spaced apart from the outer diameter and angled inwardly with one end of each magnet slot adjacent to the outer diameter, and a second end of each magnet slot adjacent to the central axis, and each magnet slot comprising a permanent magnet disposed therein, adjacent pairs of the permanent magnets, angled at about 45 degrees to each other, defining poles for the rotor,
wherein the one end and the second end of each magnet slot are two opposite ends which define inner and outer magnet free areas, the outer magnet free areas adjacent the rotor outer diameter and the inner magnet free areas radially inwardly positioned relative the rotor core outer diameter,
wherein each outer magnet free area is provided with conductive material,
wherein the electric machine comprises a cage formed by a plurality of rotor bars positioned essentially only between each of the adjacent pairs of magnets defining the poles for the rotor, and
wherein each of the adjacent pairs of magnets defining poles have only three cylindrical rotor bars equally spaced apart between the outer magnet free areas thereof.

2. The electric machine of claim 1 wherein each of the outer magnet free areas and the conductive material disposed therein is substantially "D" shaped.

3. The electric machine of claim 1 wherein the conductive material is aluminum.

4. The electric machine of claim 1 wherein the conductive material disposed in each of the outer magnet free areas is electrically connected.

5. The electric machine of claim 1 wherein the inner magnet free areas are free of conductive material.

6. The electric machine of claim 1 wherein the inner magnet free areas are provided with conductive material.

7. The electric machine of claim 1 wherein the electric machine is an interior permanent magnet motor.

8. The electric machine of claim 1 wherein a plurality of rotor bars are disposed in the laminations adjacent and inwardly of the outer diameter.

9. The electric machine of claim 8 wherein the rotor bars are circular or rectangular.

10. The electric machine of claim 9 wherein the rotor bars and the outer magnet free areas are spaced inwardly from the outer diameter substantially the same distance.

11. The electric machine of claim 1, wherein the adjacent pairs of permanent magnets are disposed in at least one of a plurality of repeating patterns based on the number of defined poles of the motor.

12. The electric machine of claim 1, wherein adjacent pairs of permanent magnets are disposed at a magnet angle with respect to each other.

13. The electric machine of claim 12, wherein the magnet angle corresponds to an angle between edges of adjacent magnet slots.

14. The electric machine of claim 13, wherein the magnet angle corresponds to an angle between a first reference line passing through a first center plane of a first magnet where the poles switch direction, and a second reference line passing through a second center plane of a second magnet where the poles switch direction, wherein the first magnet is adjacent to a second direction.

15. The electric machine of claim 1, wherein the electric machine comprises a cage formed by a plurality of rotor bars positioned only between each of the adjacent pairs of magnets defining the poles for the rotor.

16. A rotor for an electric machine, comprising:
a plurality of generally similar laminations stacked end-to-end to form a rotor core, the rotor core having an outer diameter;
a plurality of magnet slots formed through each of the laminations, the magnet slots radially spaced apart from the outer diameter and angled inwardly with one end of each magnet slot adjacent to the outer diameter, and a second end of each magnet slot adjacent to the central axis, each magnet slot comprising a permanent magnet disposed therein, adjacent pairs of the permanent magnets, angled at about 45 degrees to each other, defining poles for the rotor,
wherein the one end and the second end of each magnet slot are two opposite ends which define inner and outer magnet free areas, the outer magnet free areas adjacent the rotor outer diameter and the inner magnet free areas radially inwardly positioned relative the rotor core outer diameter,
wherein each outer magnet free area is provided with conductive material,
wherein the electric machine comprises a cage formed by a plurality of rotor bars positioned essentially only between each of the adjacent pairs of magnets defining the poles for the rotor, and
wherein each of the adjacent pairs of magnets defining poles have only three cylindrical rotor bars equally spaced apart between the outer magnet free areas thereof.

17. The rotor of claim 16 wherein each of the outer magnet free areas and the conductive material therein is substantially "D" shaped.

18. The rotor of claim 16 wherein the conductive material is aluminum.

19. The rotor of claim 16 wherein the conductive material disposed in each of the outer magnet free areas is electrically connected.

20. The rotor of claim 16 wherein the inner magnet free areas are free of conductive material.

21. The rotor of claim 16 wherein a plurality of rotor bars are disposed in the laminations adjacent and inwardly of the outer diameter, the rotor bars positioned between each of the adjacent pairs of magnets defining poles for the rotor.

22. The rotor of claim 21 wherein the rotor bars are circular or rectangular.

* * * * *